United States Patent
Yamamoto et al.

(10) Patent No.: US 8,640,577 B2
(45) Date of Patent: Feb. 4, 2014

(54) TURNING SPINDLE UNIT OF MULTI-TASKING MACHINE

(71) Applicants: Toru Yamamoto, Gifu-pref. (JP);
Yasuhiro Goshima, Gifu-pref. (JP);
Kenji Arisue, Aichi-pref. (JP);
Hirokatsu Tahara, Gifu-pref. (JP);
Hiroyuki Ueki, Aichi-pref. (JP)

(72) Inventors: Toru Yamamoto, Gifu-pref. (JP);
Yasuhiro Goshima, Gifu-pref. (JP);
Kenji Arisue, Aichi-pref. (JP);
Hirokatsu Tahara, Gifu-pref. (JP);
Hiroyuki Ueki, Aichi-pref. (JP)

(73) Assignee: Yamazaki Mazak Corporation, Aichi pref. (JP)

( * ) Notice: Subject to any disclaimer, the term of this patent is extended or adjusted under 35 U.S.C. 154(b) by 0 days.

(21) Appl. No.: 13/635,938

(22) Filed: Sep. 19, 2012

(65) Prior Publication Data

US 2013/0255454 A1 Oct. 3, 2013

(51) Int. Cl.
*B23B 19/02* (2006.01)
*B23Q 3/18* (2006.01)

(52) U.S. Cl.
USPC ............................... 82/142; 82/146; 409/231

(58) Field of Classification Search
USPC .............................. 82/142, 146, 147; 409/231
See application file for complete search history.

(56) References Cited

U.S. PATENT DOCUMENTS

| | | | | |
|---|---|---|---|---|
| 1,745,525 A | * | 2/1930 | Bissell | 408/98 |
| 4,840,095 A | * | 6/1989 | Nussbaumer et al. | 82/117 |
| 5,197,228 A | * | 3/1993 | Sharkey et al. | 451/5 |
| 5,795,114 A | * | 8/1998 | Schweizer et al. | 409/233 |
| 6,609,448 B2 | * | 8/2003 | Nakaminami et al. | 82/120 |
| 7,039,992 B2 | * | 5/2006 | Tokuma et al. | 29/27 C |
| 7,204,004 B2 | * | 4/2007 | Hashimoto et al. | 29/27 C |

FOREIGN PATENT DOCUMENTS

| | | | |
|---|---|---|---|
| DE | 196 15 383 A1 | | 10/1997 |
| DE | 102004035263 | * | 11/2005 |
| EP | 962280 A2 | * | 12/1999 |
| EP | 1 815 940 A2 | | 8/2007 |
| GB | 2305232 A | * | 4/1997 |
| JP | 57168843 A | * | 10/1982 |
| JP | 62-054667 | | 3/1987 |
| JP | 63-86958 | | 6/1988 |
| JP | 63-285322 | | 11/1988 |
| JP | 63-288605 | | 11/1988 |
| JP | 01005710 A | * | 1/1989 |
| JP | 07314275 A | * | 12/1995 |
| JP | 08099254 A | * | 4/1996 |
| JP | 09225760 A | * | 9/1997 |
| JP | 10263965 A | * | 10/1998 |
| JP | 2011056596 A | * | 3/2011 |

OTHER PUBLICATIONS

International Search Report (with partial English translation) and Written Opinion for corresponding International Application No. PCT/JP2012/059073 mailed May 22, 2012.
English translation of the Written Opinion for corresponding International Application No. PCT/JP2012/059073 mailed Mar. 19, 2013.
Supplementary European Search Report for corresponding European Application No. EP 12 77 2058 dated May 6, 2013.

* cited by examiner

*Primary Examiner* — Daniel Howell
*Assistant Examiner* — Nicole N Ramos
(74) *Attorney, Agent, or Firm* — Renner, Otto, Boisselle & Sklar, LLP (57) ABSTRACT

The present invention achieves improvement of an adjustment structure of a turning spindle in the vertical direction and the horizontal direction.
A turning spindle unit 100 includes a turning spindle base push-pull block 140 which adjusts a turning spindle base 110 fixed onto a bed 10 in the horizontal direction. The turning spindle base 110 includes a turning spindle push-pull block 180 to push and pull a turning spindle 60. A mounting seat 112 inclines at an angle to the horizontal plane.

3 Claims, 7 Drawing Sheets

TURNING SPINDLE UNIT OF MULTI-TASKING MACHINE

TECHNICAL FIELD

The present invention relates to a turning spindle unit of a multi-tasking machine.

BACKGROUND ART

Figure 5:
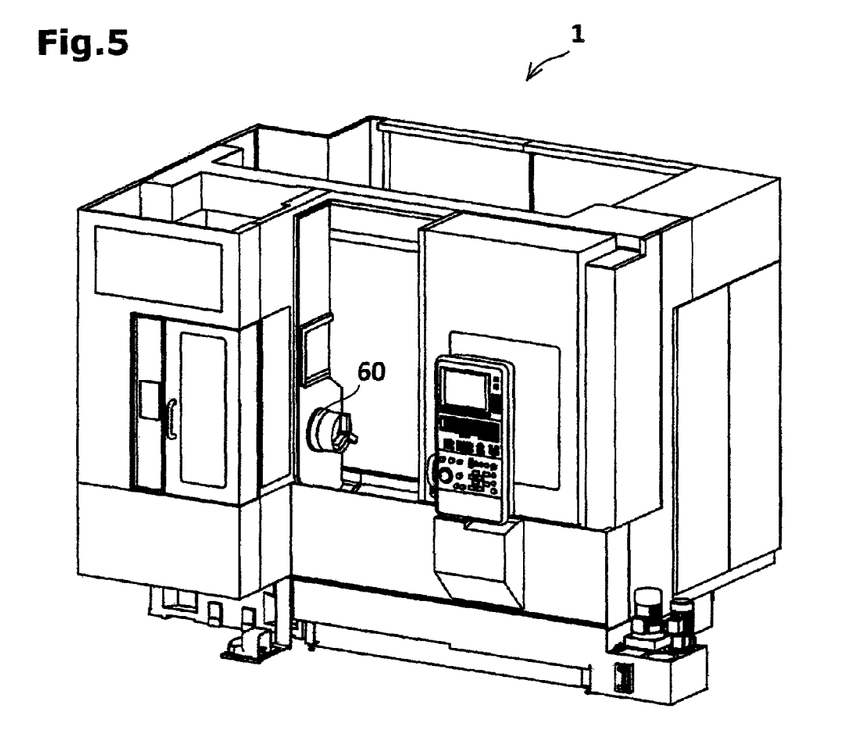
FIG. 5 is an external perspective view of a multi-tasking machine to actualize the present invention.
Figure 6:
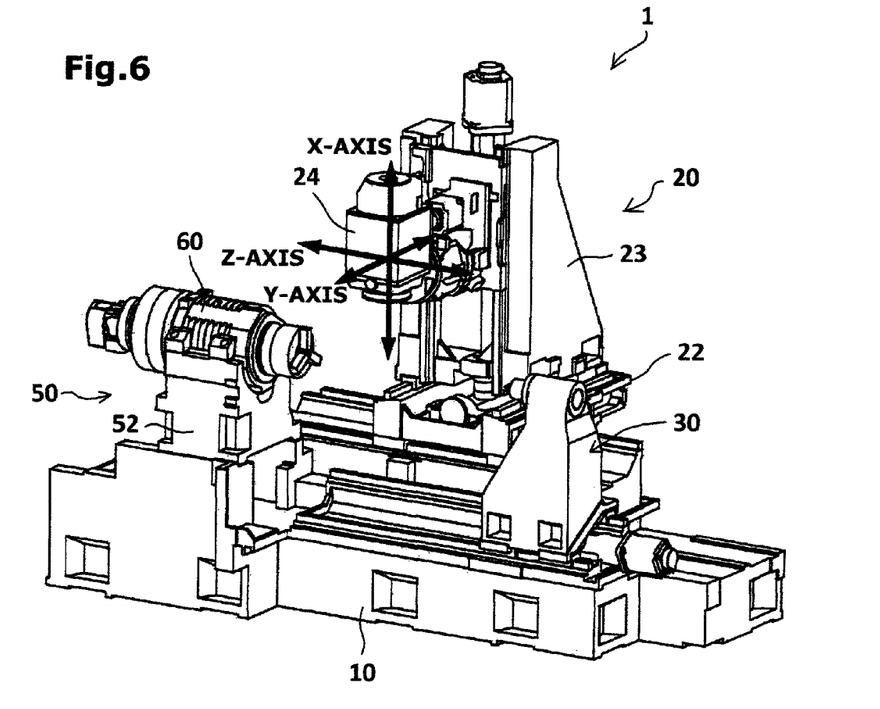
FIG. 6 is a mechanical structural view of the multi-tasking machine to actualize the present invention.

FIG. 5 illustrates an external perspective view of a multi-tasking machine according to the present invention and FIG. 6 illustrates a mechanical structural view of the multi-tasking machine eliminating a cover and the like.

A multi-tasking machine 1 includes a tool spindle unit 20 on a bed 10. The tool spindle unit 20 includes a column base 22 which moves in a z-axis direction on the bed 10, a column 23 which moves in a y-axis direction on the column base 22, and a tool spindle 24 which moves in an x-axis direction on the column 23. A tailstock 30 is mounted on the bed 10 and the tailstock 30 moves in the z-axis direction. A turning spindle unit 50 which is fixed onto the bed 10 includes a turning spindle 60 which is fixated onto a turning spindle base 52. A turning spindle 60 holds a workpiece with a chuck 62 and machining is performed with the tool spindle 24.

After assembling, the turning spindle unit 50 of the multi-tasking machine 1 is required to adjust parallelism between a turning spindle center line $C_1$ of the turning spindle 60 and a z-axis motion of the column base 22 in the vertical plane and parallelism between the turning spindle center line $C_1$ of the turning spindle 60 and the z-axis motion of the column base 22 in the horizontal plane.

Figure 7A:
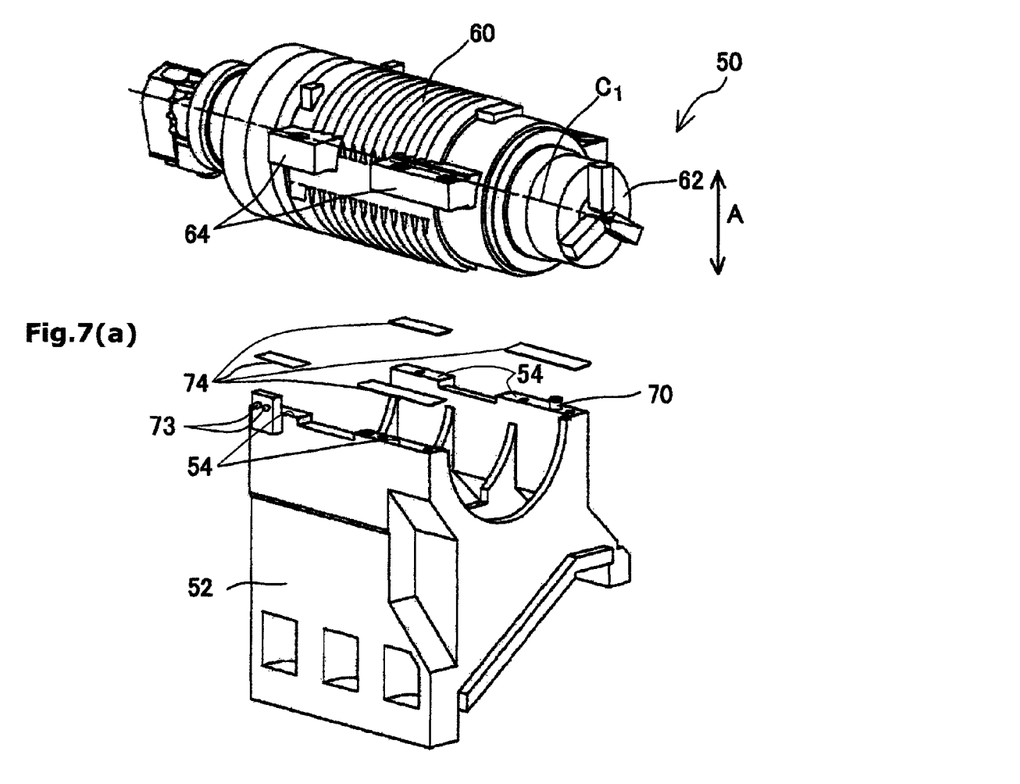
Figure 7B:
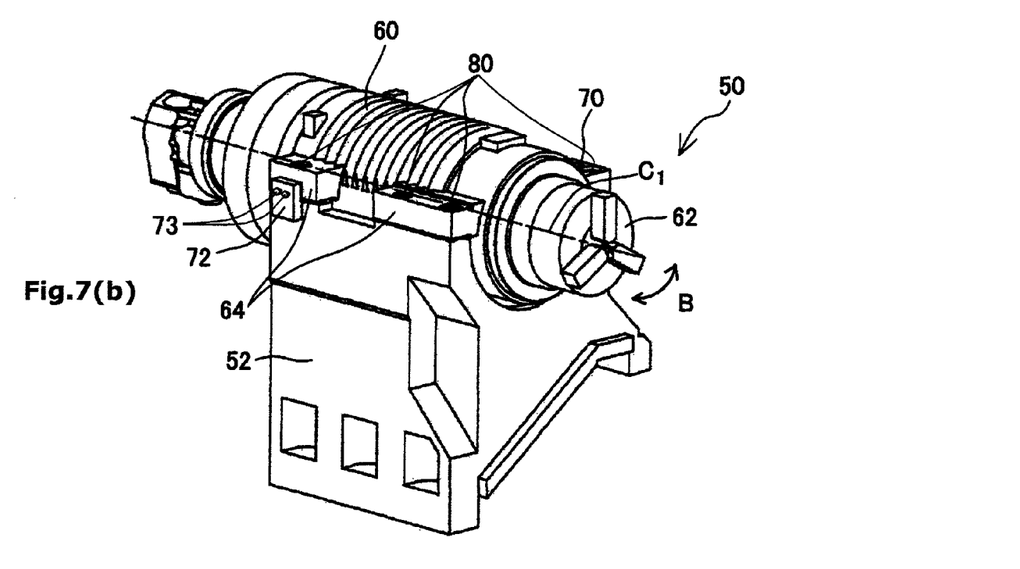

FIGS. 7(a) and 7(b) illustrate adjusting means of the turning spindle center line $C_1$ of the turning spindle 60 in a conventional turning spindle unit 50. Here, FIG. 7(a) is an exploded view and FIG. 7(b) is an assembled view.

The conventional turning spindle unit 50 is structured as to perform adjustment in a direction of arrow A (vertical direction) by nipping plate-shaped shims 74 between mounting seats 54 of the turning spindle base 52 and mounting portions 64 of the turning spindle 60.

Further, the conventional turning spindle unit 50 is structured as to perform adjustment in the horizontal direction by rotating the turning spindle 60 in a direction of arrow B with push-pull bolts 73 around a basis pin 70 for positioning of the turning spindle 60, and then, as to fix with mounting bolts 80.

Thickness of the shims 74 are required to be machined precisely to adjust the position in the direction of arrow A in this structure.

A surface grinder is utilized for machining of the shims 74 and preparation of a surface grinder is required in a case of performing adjustment of the turning spindle 60 at a customer's factory.

It is not necessarily the case that every customer possesses a surface grinder. In such a case, there is a problem that the adjustment takes time.

Further, in the above operation, it takes time for dismounting the shims 74 as plucking a positioning pin and hoisting the turning spindle 60 with a crane or the like.

It is an object of the present invention to provide a turning spindle unit of a multi-tasking machine resolving the above issues.

Here, an adjusting structure of such type of a turning unit is also disclosed in the Patent Literature 1 described below.

CITATION LIST

Patent Literature

Patent Literature 1: Japanese Patent Application Laid-Open No. 63-288605

SUMMARY OF INVENTION

Technical Problem

It is an object of the present invention to provide a turning spindle unit having an adjusting structure without a shim.

Solution to Problem

To achieve the above object, a turning spindle unit 100 of a multi-tasking machine of the present invention includes means to mount a turning spindle base 110 onto abed 10 and means to mount a turning spindle 60 onto the turning spindle base 110. The means to mount the turning spindle base 110 onto the bed 10 includes amounting face $S_2$ arranged at the horizontal plane, a basis pin 120 for positioning the turning spindle base 110 and movement adjusting means to move the turning spindle base 110 on amounting face $S_2$. The means to mount the turning spindle 60 onto the turning spindle base 110 includes an inclined plane $S_1$ arranged at an inclined plane at an angle α to the horizontal plane, a basis pin 160 for positioning the turning spindle 60, and movement adjusting means to move the turning spindle 60 on the mounting face $S_1$. The movement adjusting means of the turning spindle base 110 includes a turning spindle base push-pull block 140 and turning spindle base push-pull bolts 142 and the movement adjusting means of the turning spindle 60 includes a turning spindle push-pull block 180 and turning spindle push-pull bolts 182. The angle α is about 5 degrees.

Advantageous Effects of Invention

A turning spindle unit of the present invention can perform adjustment of parallelism between a turning spindle and a z-axis movement of a column base 22 in the vertical plane and the horizontal plane, only with operation of push-pull bolts without utilizing a shim for adjustment in the vertical direction owing to the above structure. Therefore, efficiency of an adjustment operation can be achieved.

BRIEF DESCRIPTION OF THE DRAWINGS

FIGS. 7(a) and 7(b) illustrate a conventional turning spindle unit. Here, FIG. 7(a) is an exploded view and FIG. 7(b) is an assembled view.

DESCRIPTION OF EMBODIMENTS

Figure 1:
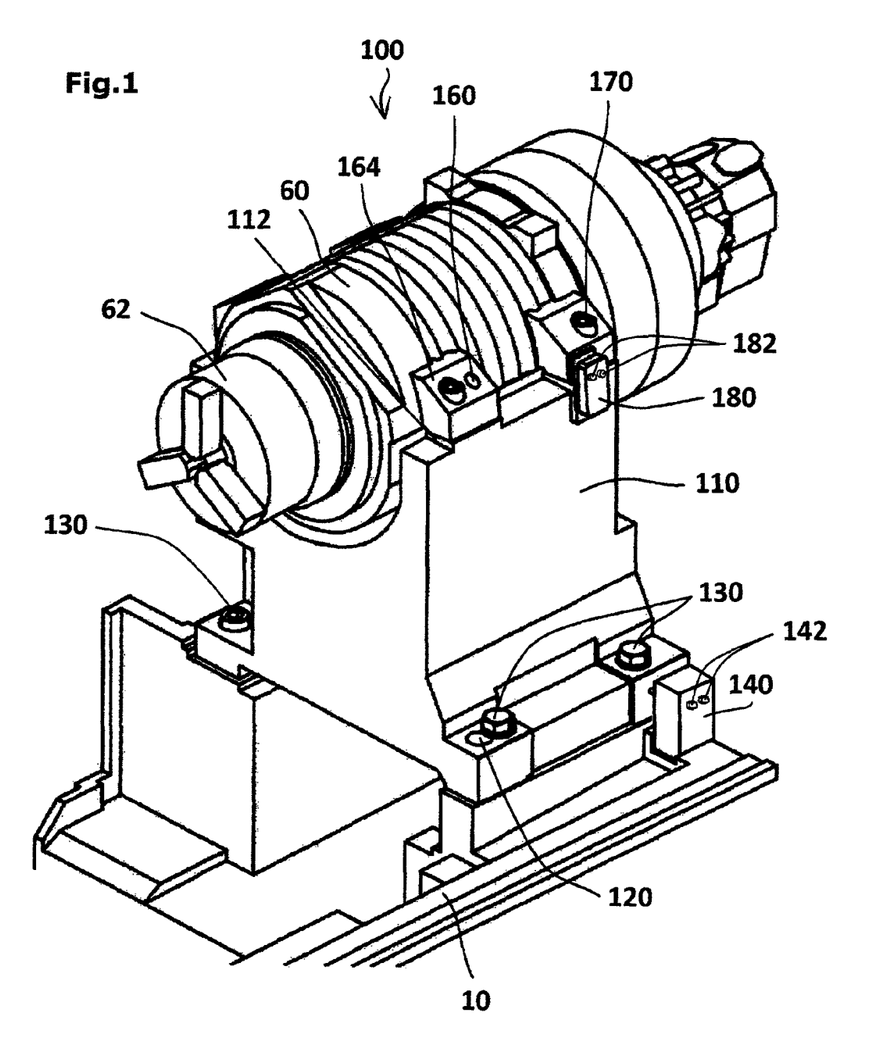
FIG. 1 is a perspective view of a turning spindle unit of the present invention.
Figure 2:
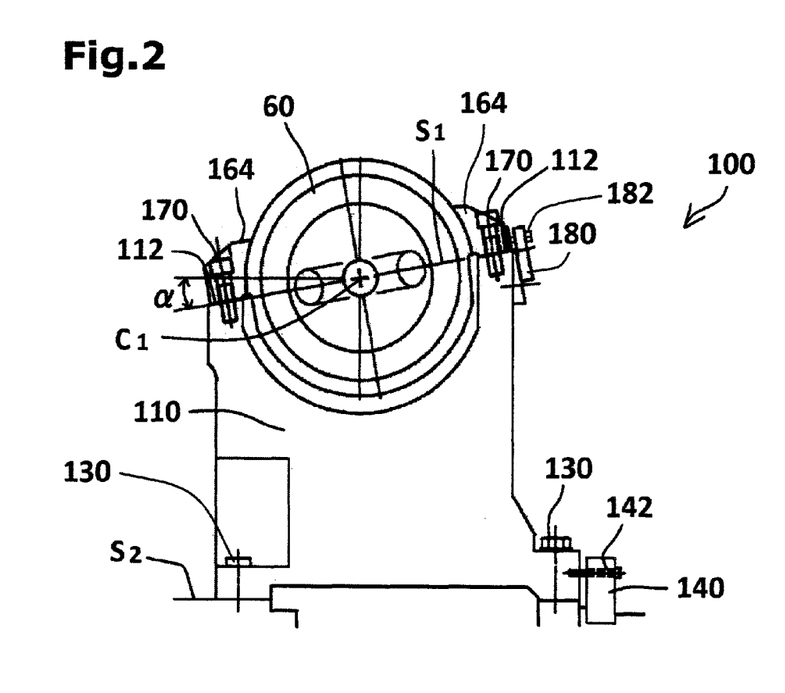
FIG. 2 is a front view of the turning spindle unit of the present invention.
Figure 3:
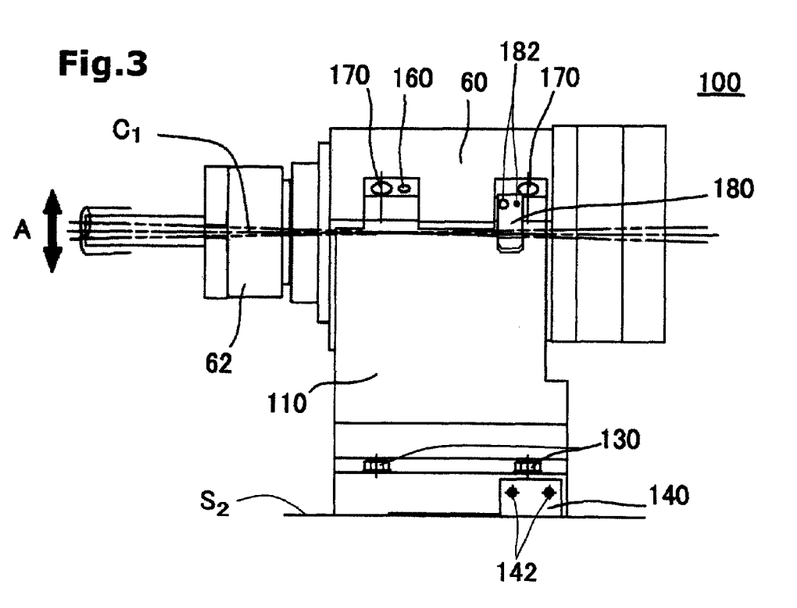
FIG. 3 is a right side view of the turning spindle unit of the present invention.
Figure 4:
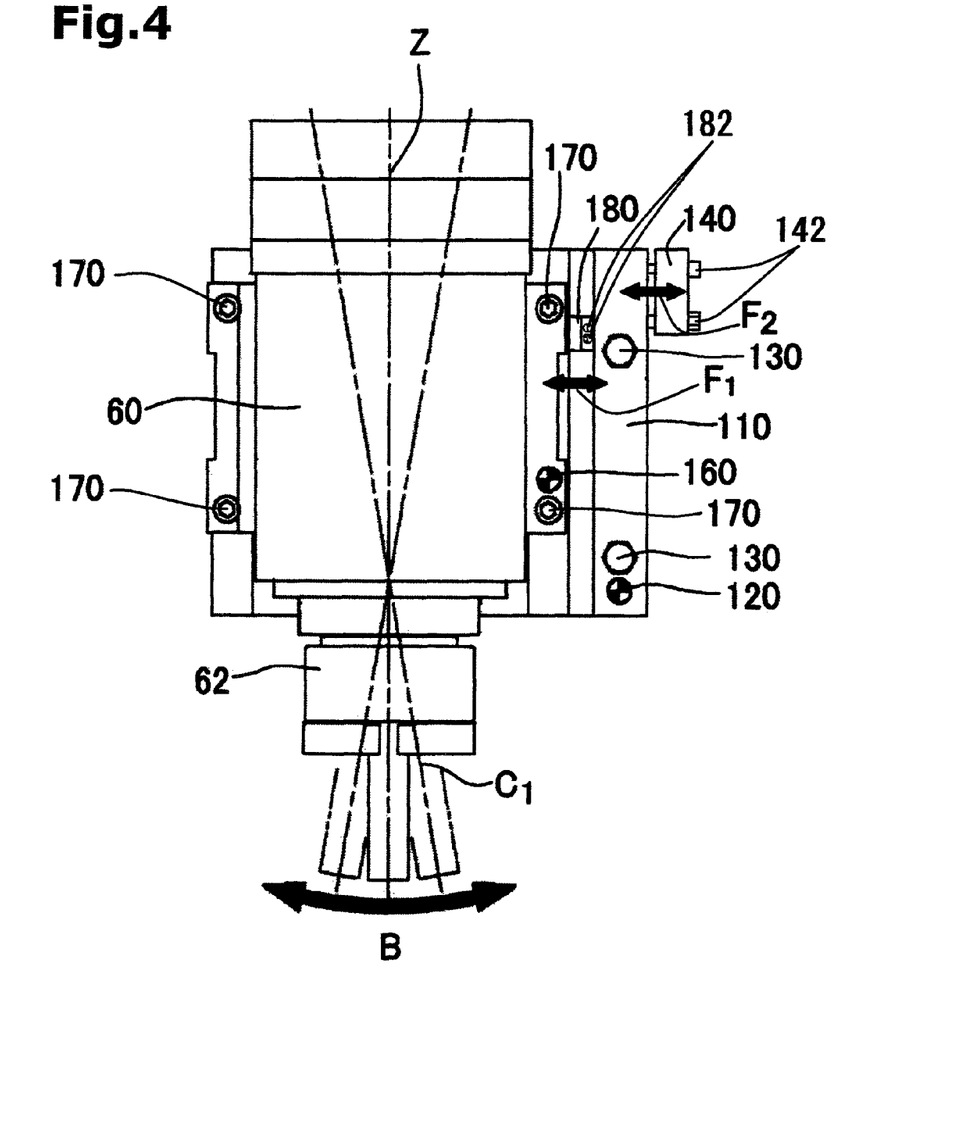
FIG. 4 is a plane view of the turning spindle unit of the present invention.

FIG. 1 is a perspective view illustrating the overall structure of a turning spindle unit of the present invention, FIG. 2 is a front view of the turning spindle unit of the present invention, FIG. 3 is a right side view of the turning spindle unit of the present invention and FIG. 4 is a plane view of the turning spindle unit of the present invention.

A turning spindle unit 100 includes a turning spindle base 110 and a turning spindle 60.

Positioning of the turning spindle base 110 on a bed 10 is performed with a turning spindle base basis pin 120 and fixing thereof is performed with turning spindle base mounting bolts 130. A turning spindle base push-pull block 140 which is vertically arranged on the bed 10 side pushes and pulls the turning spindle base 110 with push-pull bolts 142. Amounting face $S_2$ of the turning spindle base 110 on the bed 10 is a horizontal plane.

A face of a mounting seat 112 at the upper face of the turning spindle base 110 is a face formed at an inclined plane $S_1$. The inclined plane $S_1$ inclines at an angle $\alpha$ to the horizontal plane and includes or is parallel to a turning spindle center line $C_1$.

The turning spindle base 110 has a turning spindle push-pull block 180 which is fixed on the turning spindle base 110 and turning spindle push-pull bolts 182 are mounted thereon. The turning spindle 60 is mounted on the mounting seats 112 with mounting portions 164. Further, the turning spindle 60 is positioned on the turning spindle base 110 with a turning spindle basis pin 160 and fixed with turning spindle mounting bolts 170.

FIG. 3 illustrates an effect to adjust the position of the turning spindle center line $C_1$ in the vertical direction as indicated by arrow A. The turning spindle push-pull block 180 has turning spindle push-pull bolts 182. When the turning spindle push-pull bolts 182 are adjusted in a direction of arrow $F_1$ in FIG. 4, the turning spindle center line $C_1$ moves in the direction of arrow A by an effect of the inclined plane $S_1$. Thus, adjustment is performed.

After the adjustment, the turning spindle 60 is fixed on the turning spindle base 110 by tightening of the turning spindle mountings bolts 170.

When adjustment of the turning spindle center line $C_1$ in the vertical direction is performed as described above, the turning spindle 60 is rotated around the spindle basis pin 160 on the inclined plane $S_1$ and the turning spindle center line $C_1$ is also rotated in a direction of arrow B.

Subsequently, the whole turning spindle base 110 is moved in a direction of arrow $F_2$ by operating the turning spindle base push-pull bolts 142 arranged on the turning spindle base push-pull block 140 as illustrated in FIG. 4. The turning spindle base 110 is horizontally rotated on the mounting face $S_2$ around the turning spindle base basis pin 120 owing to the operation. Therefore the turning spindle center line $C_1$ moves in the direction of arrow B. Thus, adjustment is performed. After the adjustment, the turning spindle base 60 is fixed on the bed 10 by tightening of the turning spindle base mountings bolts 130.

According to the present invention, since the mounting face of the turning spindle 60 on the turning spindle base 110 of the turning spindle unit 100 is set as an inclined plane to the horizontal plane as described above, the position of the turning spindle center line $C_1$ in the vertical direction can be adjusted without utilizing shims.

Here, the angle $\alpha$ between the inclined plane $S_1$ for mounting the turning spindle and the horizontal plane is practical to be about 5 degrees.

Therefore, adjustment of the turning spindle push-pull bolts 182 can be performed to the extent of a gap (backlash) existing between the turning spindle mounting bolts 170 and bolt holes. Here, the turning spindle mounting bolts 170 are M16 and the bolt holes are $\phi$18. Therefore, an adjusting width of the turning spindle mounting bolt 170 at the most distant position from the turning spindle basis pin 160 is to be ±1 mm. At that time, an adjustment width of the turning spindle push-pull bolts 182 is determined by the ratio of a distance from the turning spindle basis pin 160 to the turning spindle mounting bolt 170 at the most distant therefrom to a distance from the turning spindle basis pin 160 to the turning spindle push-pull bolts 182. The adjusting width of the turning spindle push-pull bolts 182 is to be about 0.7 to 0.9 times of the adjusting width of the turning spindle mounting bolt 170 at the most distant position from the turning spindle basis pin 160, although affected by the dimension of height and width of the turning spindle unit 100. Here the adjusting width of the turning spindle push-pull bolts 182 is assumed to be ±0.7 mm. Then, the adjusting width at a parallelism measuring point on the inclined plane is calculated from a distance D between the turning spindle basis pin 160 and the turning spindle push-pull bolts 182 and a distance L between the turning spindle basis pin 160 and the measuring point (±0.7 mm×L/D). This indicates that the adjusting width can be set arbitrarily depending on the value of D and L. However, since fine adjustment becomes difficult when the ratio (L/D) is too large, it is assumed in this embodiment that the ratio is 1. Assuming that adjustment of ±0.7 mm can be performed on the inclined plane, adjustable displacement in the vertical direction is "±0.7 mm×sin $\alpha$" at this time to be ±24 μm when $\alpha$=2°, ±61 μm when $\alpha$=5° and ±122 μm when $\alpha$=10°. Here, a dimensional variation of an assembled machine is generally about ±60 μm, considering the sum of dimensional tolerance of related components. On the other hand, from the view point of easiness of adjustment, the adjusting width of the turning spindle push-pull bolts 182 is ±0.7 mm and the bolt rotates about 200 degrees (≈360°/1.25×0.7) in a case that bolts being M8P1.25 are utilized as the push-pull bolts, for example. Since the displacement in the vertical direction as described above can be obtained with this rotation angle, displacement at the time that the bolt is rotated by 10 degrees is to be "3 μm/10°" (≈61/200×10) when $\alpha$=5° and "6 μm/10°" (≈122/200×10) when $\alpha$=10°. It is obvious that adjustment is easy as the angle is small. Accordingly, considering the dimensional variation of the assembled machine, $\alpha$=2° cannot be adopted owing to that the dimensional variation cannot be accepted and $\alpha$=5° being the smallest angle among the adoptable angle is appropriate. Then, in order to easily obtain an optimal designing value which can accept the dimensional variation of the assembled machine and which is regarding the turning spindle unit which can be easily adjusted, final fine adjustment of the ratio (L/D) described above can be performed.

Movement means for adjustment is explained with an example of a push-pull block and push-pull bolts arranged on the push-pull block. However, it is obviously possible to substitute with means capable of fine movement, for example, push blocks arranged on both sides of a body to be adjusted and push bolts arranged on the push blocks or adjusting means with an eccentric pin.

REFERENCE SIGNS LIST

1 Multi-tasking machine
2 Bed
20 Tool spindle unit
22 Column base

23 Column
24 Tool spindle
30 Tailstock
50 Turning spindle unit
52 Turning spindle base
54 Mounting seat
60 Turning spindle
62 Chuck
64 Mounting portion
70 Basis pin
72 Push-pull block
73 Push-pull bolt
74 Shim
80 Mounting bolt
100 Turning spindle unit
110 Turning spindle base
112 Mounting seat
120 Turning spindle base basis pin
130 Turning spindle base mounting bolt
140 Turning spindle base push-pull block
142 Turning spindle base push-pull bolt
160 Turning spindle basis pin
164 Mounting portion
170 Turning spindle mounting bolt
180 Turning spindle push-pull block
182 Turning spindle push-pull bolt
$C_1$ Turning spindle center line

The invention claimed is:

1. A turning spindle unit of a multi-tasking machine, comprising:
a turning spindle base which is mounted on a bed of the multi-tasking machine; and
a turning spindle which is mounted on the turning spindle base, wherein
means to mount the turning spindle base on the bed includes a base mounting face at the horizontal plane, a base basis pin which performs positioning of the turning spindle base, and base movement adjusting means which moves the turning spindle base on the base mounting face; and
means to mount the turning spindle on the turning spindle base includes a spindle mounting face at an inclined plane at an angle $\alpha$ to the horizontal plane, a spindle basis pin which performs positioning of the turning spindle, and spindle movement adjusting means which moves the turning spindle on the spindle mounting face.

2. The turning spindle unit of a multi-tasking machine according to claim 1, wherein the angle $\alpha$ is about 5 degrees.

3. The turning spindle unit of a multi-tasking machine according to claim 1, wherein each of the movement adjustment means includes a push-pull block and push-pull bolts arranged on the push-pull block.

* * * * *

UNITED STATES PATENT AND TRADEMARK OFFICE
CERTIFICATE OF CORRECTION

PATENT NO.        : 8,640,577 B2
APPLICATION NO.   : 13/635938
DATED             : February 4, 2014
INVENTOR(S)       : Toru Yamamoto et al.

It is certified that error appears in the above-identified patent and that said Letters Patent is hereby corrected as shown below:

On the Title Page, Item (22):
 "(22) Filed:    Sep. 19, 2012" should read:
 -- (22) PCT Filed:    Apr. 3, 2012 --

On the Title Page, Item (86) should be added:
 -- (86) PCT No.:      PCT/JP2012/059073
    § 371 (c)(1),
    (2), (4) Date:     Sep. 19, 2012 --

Signed and Sealed this
Third Day of June, 2014

Michelle K. Lee
*Deputy Director of the United States Patent and Trademark Office*